US008961649B2

(12) United States Patent
Pereira et al.

(10) Patent No.: US 8,961,649 B2
(45) Date of Patent: Feb. 24, 2015

(54) SYSTEM AND METHOD FOR EXTRACTING BASE METAL VALUES FROM OXIDE ORES

(75) Inventors: Antonio Clareti Pereira, Minas Gerais (BR); Flavia Dutra Mendes, Minas Gerais (BR); Tiago Valentim Berni, Minas Gerais (BR); Ahmed Vahed, Oakville (CA)

(73) Assignee: Vale Canada Limited, Toronto (CA)

( * ) Notice: Subject to any disclaimer, the term of this patent is extended or adjusted under 35 U.S.C. 154(b) by 1068 days.

(21) Appl. No.: 12/198,229

(22) Filed: Aug. 26, 2008

(65) Prior Publication Data

US 2009/0241731 A1 Oct. 1, 2009

Related U.S. Application Data

(60) Provisional application No. 60/968,627, filed on Aug. 29, 2007.

(51) Int. Cl.
```
C22B 15/00    (2006.01)
C22B 1/08     (2006.01)
C22B 3/10     (2006.01)
C22B 23/00    (2006.01)
C22B 3/00     (2006.01)
C22B 5/00     (2006.01)
C22B 21/00    (2006.01)
```
(52) U.S. Cl.
CPC ... C22B 1/08 (2013.01); C22B 3/10 (2013.01); C22B 23/005 (2013.01); C22B 23/04 (2013.01); C22B 23/0407 (2013.01); C22B 23/0453 (2013.01); C22B 23/0461 (2013.01)
USPC .................. 75/420; 75/424; 75/425

(58) Field of Classification Search
USPC .......................................... 75/420, 424, 425
See application file for complete search history.

(56) References Cited

U.S. PATENT DOCUMENTS

| 3,661,564 A | 5/1972 | Gandon et al. ............... 75/101 R |
| 3,863,002 A * | 1/1975 | Pace et al. ........................ 423/20 |
| 3,892,639 A | 7/1975 | Leavenworth, Jr. et al. .. 204/105 |
| 3,909,249 A | 9/1975 | Coldrey |
| 5,571,308 A | 11/1996 | Duyvesteyn et al. ........... 75/430 |
| 7,329,396 B2 | 2/2008 | Harris et al. .................. 423/140 |

FOREIGN PATENT DOCUMENTS

| CA | 1096634 | 3/1981 | |
| GB | 863766 | 3/1961 | |
| WO | WO 0208477 | 1/2002 | ............... C22B 23/00 |
| WO | WO 02053788 | 7/2002 | ............... C22B 1/08 |
| WO | WO 2007106969 | 9/2007 | ............... C22B 3/06 |

OTHER PUBLICATIONS

Akman et al. "Nickel chloride interferences on zinc and cobalt in graphite furnace atomic absorption spectrometry using a dual cavity platform", Spectrochimica Acta Part B, 50 (1995), 975-984.*

* cited by examiner

*Primary Examiner* — Rebecca Lee
(74) *Attorney, Agent, or Firm* — Arent Fox LLP (57) ABSTRACT

A method for recovering base metal values from oxide ore is provided by the present disclosure. The ore includes a first metal selected from the group consisting at least one of iron and aluminum and a second metal selected from the group consisting of at least one of nickel, cobalt and copper. The method includes the steps of: contacting the oxide ore with hydrogen chloride gas to obtain chlorides of the first and second metals and subjecting at least the first and second metals to pyrohydrolysis at a predetermined temperature to decompose the chlorides of the first metal into oxides. The method also includes the step of mixing the oxides of the first metal and the chlorides of the second metal in an aqueous solution to dissolve the chlorides of the second metal and recovering the dissolved ions of the second metal from the aqueous solution.

18 Claims, 4 Drawing Sheets

SYSTEM AND METHOD FOR EXTRACTING BASE METAL VALUES FROM OXIDE ORES

RELATED APPLICATION

This application claims priority from U.S. provisional application Ser. No. 60/968,627 filed on Aug. 29, 2007.

TECHNICAL FIELD

The present disclosure relates to recovery of base metal values, such as nickel, cobalt or copper, from oxide type materials.

BACKGROUND OF THE INVENTION

Nickel is employed, as a pure metal or an alloy, in a variety of products. Nickel is largely used in stainless steel industry, along with chromium and molybdenum. Nickel use can be categorized into high-purity and lower-purity derivatives. High-purity derivatives, with at least 99% of nickel content (electrolytic nickel at 99.9% and carbonyl pellets at 99.7%) are usually used in metallurgical applications. Lower-purity derivatives, 20% to 96% of nickel content derivatives (ferro-nickel, matte, oxides and sinter) are generally employed in stainless steel industry and other steel alloys. Nickel scraps are also fed to siderurgy.

Nickel is generally obtained from laterite or sulfide ores. Laterite ores were a major source of early nickel. In 1950, less than 10% of worldwide production of nickel was provided from laterites, with sulfide deposits providing the bulk of nickel ore during that time period. Currently, production of nickel from sulfide ores has leveled off. As nickel demand continues to increase this gap may be fulfilled with laterite exploitation. Laterites correspond to about 70% of world land-based nickel resources, while accounting only for approximately 40% of nickel production. It is expected that approximately 51% of nickel production will be from laterite sources by 2012, based on the average rate of increase in production of 4% per year.

Laterite is a surface ore of red-brown color, generally found in hot and wet tropical areas. Laterite ore is rich in iron and aluminum and is produced by intensive and long lasting weathering, known as lateritization, of the underlying parent rock, such as ultramafic igneous rocks. Lateritization of ultramafic igneous rocks (serpentinite, dunite, or peridotite containing about 0.2-0.3% nickel) often results in a considerable nickel concentration. Laterites also consist mainly of the minerals kaolinite, goethite, hematite and gibbsite that form in the course of weathering. Moreover, many laterites contain quartz as relatively stable relic mineral from the parent rock.

Processing of laterite ores poses several problems. A major challenge faced by some processing plants is that solid-liquid separation stages are not very efficient. In particular, due to poor pulp settlement in a counter-current decantation (CCD) stage, roughly 10% of soluble nickel and cobalt are lost in rejects and in waste. Significant infrastructure investments have to be made to minimize such significant loss, such as utilizing a series of at least six large thickeners in solid-liquid separation to ensure proper solid settlement. Thus, a capital cost investment for a laterite ore processing plant utilizing conventional processes can be cost-prohibitive.

Numerous techniques have been explored for processing nickel laterite ore. U.S. Pat. No. 3,661,564 is directed to method for the recovery of nickel and cobalt from laterite with the elimination of iron, wherein the laterite is divided into a major and a minor portion and the minor portion is treated with hydrochloric acid to form a suspension. The major portion of laterite is mixed with the suspension to form a slurry which is roasted to form cobalt and nickel chloride. The nickel and cobalt chlorides are then dissolved by treating the solid residue with water, ferric chloride remaining in the residue. The solution is then subjected to a recovery treatment including cation exchange to separate the cobalt and nickel ions, and reduction to produce cobalt and nickel.

U.S. Pat. No. 3,892,639 discloses a method for the extraction of metal values from laterite ores including nickel, chromium, manganese, iron and cobalt by a series of steps including chlorinating the ore in a fluidized bed with hydrogen chloride gas to form volatile metal chlorides of nickel, iron, cobalt and manganese, and a residue containing chromium, removing and condensing the volatile chlorides to effect separation, recovering the metals of nickel, cobalt and manganese and chlorine as by the use of electrolytic cells, reacting the iron chloride with oxygen to separate the iron as iron oxide; removing the residue from the fluid bed reactor for reduction with carbon to produce carbides; leaching to form salts of chromium, separating from other salts, and recovering the chromium.

U.S. Pat. No. 5,571,308 relates to a method for recovering nickel from high magnesium-containing lateritic ores which also contain iron. The ores which are referred to as saprolitic ores are subjected to leaching with a mineral acid from the group consisting of HCl, $H_2SO_4$ and $HNO_3$. Following leaching with HCl, for example, the pregnant solution obtained is separated from undissolved solids and the nickel is preferably recovered by contacting the solution with a resin selective to nickel absorption. The raffinate remaining which contains iron and magnesium chlorides may be subjected to pyrohydrolysis to produce their respective oxides and free HCl for recycle into the leaching system. The nickel is extracted from the resin using a stripping solution of said acid, and the nickel thereafter extracted from the nickel-loaded stripping solution.

Several chloridization processes are described in the following International Publications Nos. WO/2002/008477, WO/2002/053788 and WO/2007/106969. International Publication No. WO/2002/008477 discloses a method for the recovery of nickel, cobalt, iron, chromium and magnesium species from laterite ores by a series of steps which include grinding the ore to produce particles; chlorinating the ore by first subjecting them to gaseous hydrochloric acid and secondly, by curing them with concentrated HCl to form water soluble salts of nickel, cobalt, iron, chromium and magnesium, filtering the solution; selectively recovering nickel and cobalt by a process selected from the group of processes consisting of electrowinning, solvent extraction, specific ion-exchange resins and sulfide precipitation.

International Publication No. WO/2002/053788 is directed to a method for the recovery of base metals such as cobalt, nickel, copper, lead, zinc, mercury and cadmium, precious metals such as silver and gold, as well as the platinum group metals, comprising ruthenium, rhodium, palladium, osmium, iridium and platinum from fresh ore, mine tailings and industrial wastes by a series of steps which include analyzing the ore, mine tailings or industrial wastes to determine the presence of one or more of the above mentioned metals; chloridating the ore with a strength determined by the presence of the most refractory of the metals ascertained by the analyzing step, in the presence of a source of chloride ions in an amount determined by the metals present to form a solution of metal chlorides and a sterile residue; separating the solution of metal chlorides from the residue to produce a filtered solution of metal chlorides; recovering the metal chlorides from the filtered solution of metal chlorides to produce a barren solution; recycling the source of chloride ions.

International Publication No. WO/2007/106969 relates to an essentially open-circuit process for recovering value metal species from a laterite-type feedstock, the process comprising the sequential or unsequential steps of separating the laterite-type feedstock into a first and a second fraction; reacting an acid with a chloride salt in a first compartment, thereby generating gaseous HCl; chlorinating the first fraction with the gaseous HCl in a second compartment, thereby producing a chlorinated fraction, wherein excess HCl is recovered and dissolved in water, thereby producing a concentrated HCl solution; combining the chlorinated fraction and the second fraction into a mixture; leaching the mixture with the concentrated HCl solution in a third compartment, thereby producing a reaction mass; submitting the reaction mass to a separation of phases, thereby separating an insoluble residue from a head solution; and selectively recovering value metal species from the head solution.

U.S. Pat. No. 7,329,396 discloses a process for leaching a value metal from oxidic materials, such as a lateritic nickel ore, comprising the step of leaching the ore with a lixiviant comprising a cationic salt (e.g., magnesium chloride) and hydrochloric acid is disclosed. An oxidant or additional metal chloride (such as that which results from the leaching operation) may be added. In one embodiment, the process comprises recovery of a value metal from ore comprising the steps of leaching the ore with a lixiviant; separating a value metal-rich leachate from the ore in a first solid-liquid separation; oxidizing and neutralizing the value metal-rich leachate so obtained; and separating a solution of magnesium chloride from the leachate so obtained in a second solid-liquid separation. In another embodiment, the lixiviant solution is regenerated from the solution of magnesium chloride.

Although a significant effort has been put into chloridization of base metal oxides, all processes developed so far have failed to do so effectively. Most chloridization processes discussed above require high temperatures and specialized engineering solutions to deal with corrosiveness of HCl. Some of the processes discussed above which do exploit low temperature chloridization are problematic in terms of downstream processing, as they need costly and complex iron and aluminum removal stages. Thus, there is a need for an improved chloridization process that simplifies downstream processing.

SUMMARY OF THE INVENTION

A method for recovering base metal values from oxide materials, for example, laterite ore, is provided by the present disclosure. The material includes a first metal selected from the group consisting at least one of iron and aluminum and a second metal selected from the group consisting of at least one of manganese, nickel, cobalt and copper. The method includes the steps of: contacting the oxide material with hydrogen chloride gas (HCl) to obtain chlorides of the first and second metals and subjecting the first and second metals to pyrohydrolysis at a predetermined temperature to decompose the chlorides of the first metal into oxides. The method also includes the steps of mixing the oxides of the first metal and the chlorides of the second metal in an aqueous solution to dissolve the chlorides of the second metal and recovering the dissolved ions of the second metal from the aqueous solution.

A method for treating a laterite ore comprising a nickel oxide and at least one base metal oxide is also contemplated by the present disclosure. The method includes the steps of contacting the laterite ore with hydrochloric acid to obtain a nickel chloride and at least one base metal chloride and subjecting the nickel chloride and at least one base metal chloride to pyrohydrolysis to decompose the at least one base metal chloride into at least one base metal oxide. The method also includes the steps of mixing the nickel chloride and the at least one metal oxide in an aqueous solution to dissolve the nickel chloride and recovering the dissolved ions of the nickel chloride from the aqueous solution.

PREFERRED EMBODIMENT OF THE INVENTION

The present disclosure relates to a process for recovering base metal values from oxide materials, specifically metals found, e.g., in laterite ore, such as nickel, cobalt and copper.

In accordance with the present disclosure, oxide materials, in special laterite ores are treated with gaseous hydrochloric acid (HCl) to produce an iron and aluminum-free solution that carries base metals as nickel, cobalt and copper.

As discussed in more detail below, the oxide material is initially crushed or granulated, to liberate the oxide base metals prior to treating with gaseous HCl. To obtain a solution that carries base metals, the now particle-reduced oxide material is contacted with hydrogen chloride at controlled temperature and environment. At this stage, all the base metal oxides are properly converted to their chlorides. In order to obtain an iron and aluminum-free solution, the chloridized material is heated and provided with enough water to pyrohydrolyse ferric and aluminum chlorides. This step also regenerates part of the HCl that can be used at the anterior operation for chloridization. Chlorides are highly soluble in water; therefore, the remaining chloridized material is solubilized in a controlled pH solution, preventing the newly formed oxides from leaching.

After solid-liquid separation, the solution is therefore, iron and aluminum-free. The solubilized base metals can then be purified into sellable products by various methods. Several downstream operations that are known in art may be used, without the need for an iron and aluminum removal stage.

Figure 1:
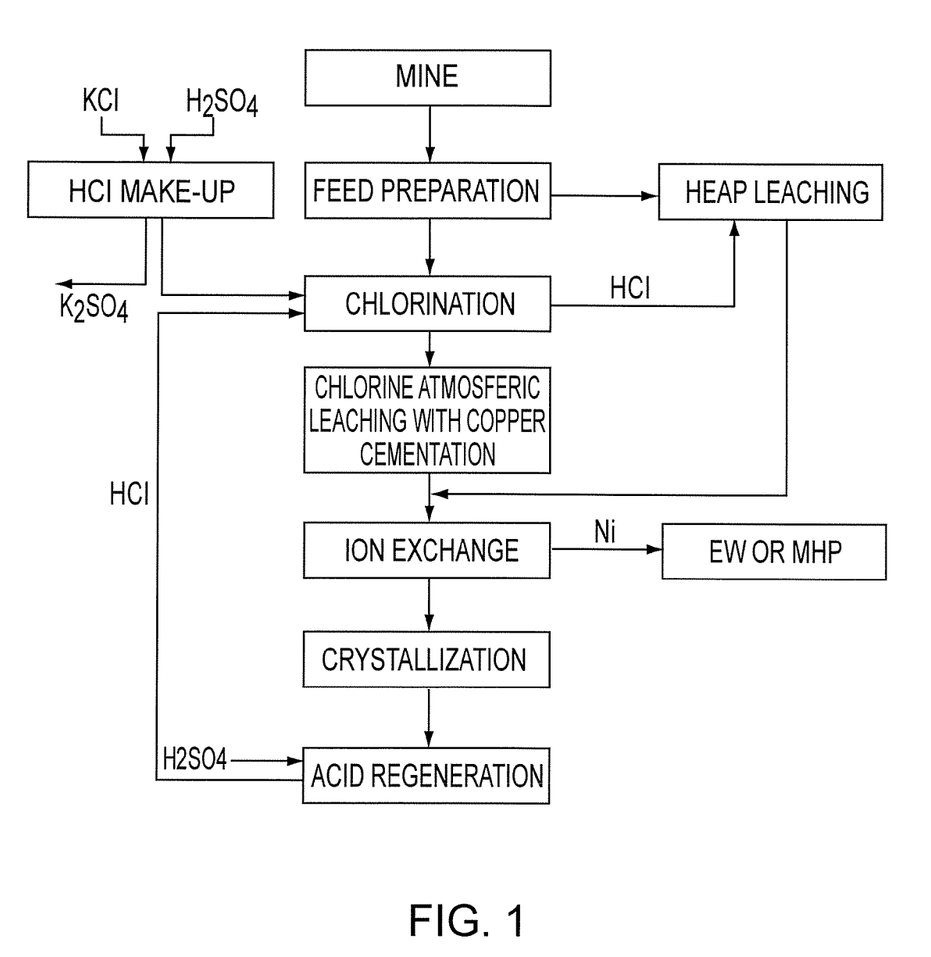
FIG. 1 is a flow chart of a process for extracting nickel from laterite ore according to one embodiment of the present disclosure.
Figure 2:
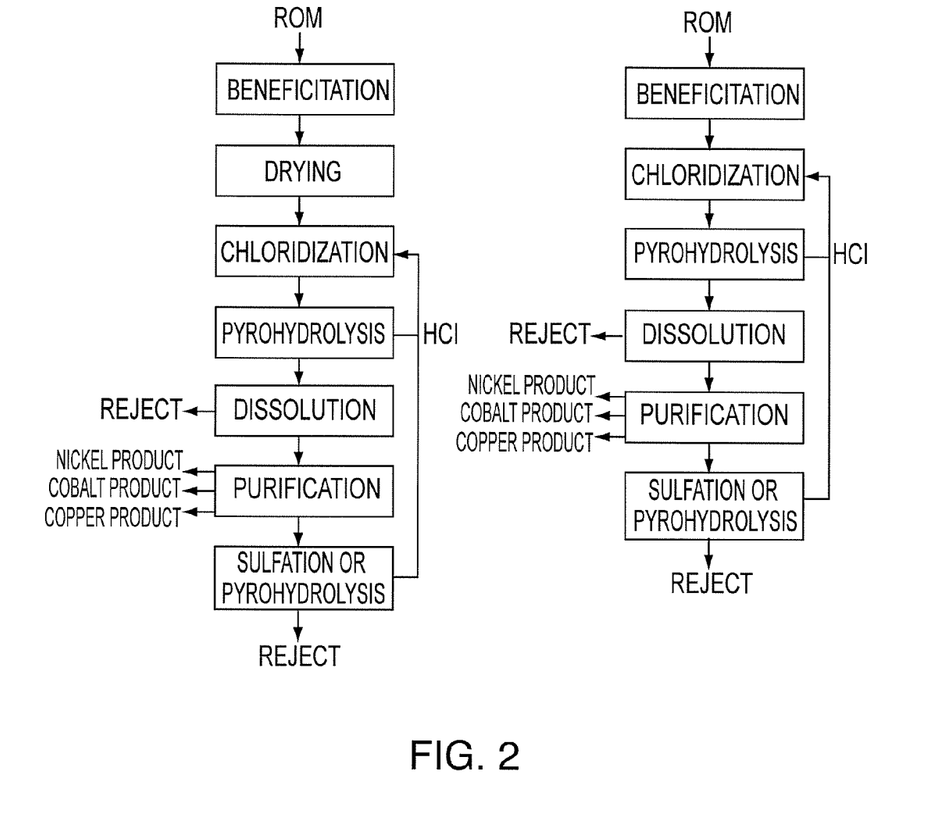
FIG. 2 is a flow chart of a process for extracting nickel from laterite ore according to another embodiment of the present disclosure.

FIGS. 1 and 2 illustrate an exemplary embodiment of a process for extracting base metal values, such as nickel and cobalt from an oxide ore (e.g., laterite). Oxide ores may include various base metals, such as iron, manganese, aluminum, nickel, cobalt and copper. Base metal values can be extracted from their oxide forms by contacting them with gaseous HCl, thus forming their respective chlorides. In order to promote effective contact between gas and solids containing the metal values, a particle size reduction step is preferably included. Effective gas-solid contact can be attained with a reduced particle size. In one embodiment, particle size may be from about 0.5 mm and 50 mm. In another embodiment, particle size may be less than 0.5 mm.

After the ore is extracted from the mine, the ore is prepared to be fed into the extraction plant. In one exemplary embodiment, the ore is granulated or crushed into particles of not larger than 50 mm. As used herein, granulated and crushed may be used interchangeably. The ore particles may be then separated into two fractions: with the first fraction being from about 10 mm to about 50 mm and the second fraction having particles of less than about 10 mm. The second fraction may be then separated into two additional fractions: a third fraction from about 0.5 mm to about 10 mm and a fourth fraction including particles less than 0.5 mm. The discussed fractions are exemplary and those skilled in the art may provide more or less fractions of varying sizes.

After the ore is separated into adequate particle-sized portions, the ore particles are chloridized by subjecting the ore to hydrogen chloride gas. It is contemplated that HCl, which is utilized in the present disclosure, may be obtained from any suitable source. In one embodiment, hydrochloric acid may be produced by reacting a chloride salt, such as sodium chloride (NaCl), potassium chloride (KCl) with an acid, such as sulfuric acid ($H_2SO_4$). The general reaction for HCl production is shown by formula (I) below, wherein M is metal:

$$2MCl(s) + H_2SO_4(l) \rightarrow M_2SO_4(s) + 2HCl(g) \quad (I)$$

In one embodiment, potassium chloride may be used as a chloride salt. Reacting potassium chloride with sulfuric acid produces dry hydrochloric acid (e.g., free of water) and a useful byproduct, potassium sulfate ($K_2SO_4$). In addition, this reaction is already extremely favorable at ambient temperature. Reaction of potassium chloride with sulfuric acid is shown below in formula (II):

$$KCl(s) + H_2SO_4(l) \rightarrow K_2SO_4(s) + 2HCl(g) \quad (II)$$

Figure 3:
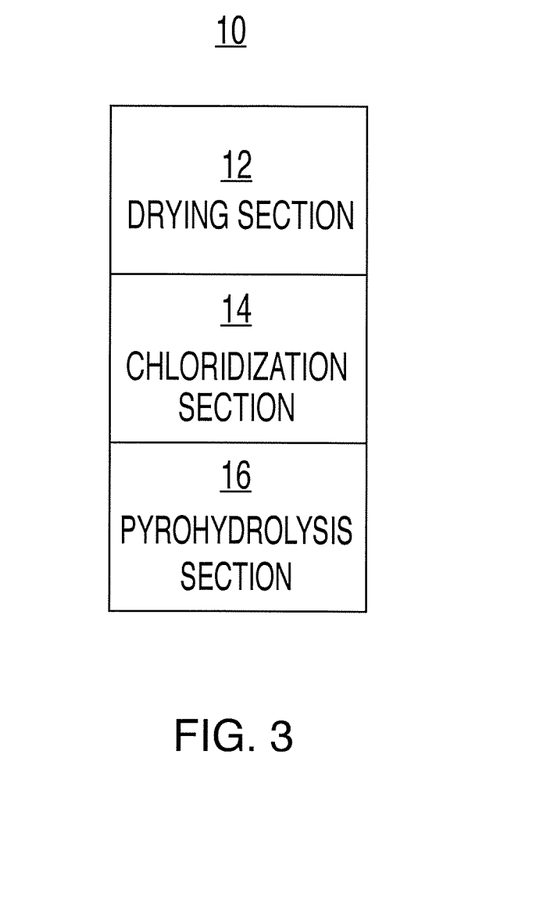
FIG. 3 is a schematic illustration of an exemplary chloridization furnace according to the present disclosure.

After the ore is granulated into particles of suitable size, the ore is fed through a chlorination furnace 10 shown in FIG. 3, in which the ore is treated under a counter-current hydrogen chloride gas flux. Part of the hydrogen chloride used in the flux is generated within the furnace 10, by pyrohydrolysis of thermo-sensitive chloride salts and complemented by regeneration with sulfuric acid as discussed in more detail below. The use of single furnace is exemplary and the disclosed process may be implemented in multiple furnaces.

The furnace 10 includes a drying section 12, a chlorination section 14 and a pyrohydrolysis section 16. The drying section 12 may be optional. The drying section 12 of the furnace 10 heats the ore from about 60° C. to about 150° C., e.g., 100° C. to remove any residual water therefrom. In the chloridization section 14, the crushed ore is subjected to treatment with hydrogen chloride such that metal oxides in the ore, including oxides of iron, aluminum, nickel, cobalt, copper and others are chloridized. HCl can be applied as dry gas, e.g., a gas flux, or as a wet gas. Lower HCl partial pressure may be compensated by increasing the flow rate.

The base metals oxides are chloridized by contacting the oxides with gaseous HCl, in an oxidizing environment. Chloridization can be done at a lower temperature than most conventional processes. In one embodiment chloridization may be performed from about 50° C. to about 250° C. In another embodiment chloridization may be performed from about 100° C. to about 200° C. In a further embodiment, chloridization may be performed at temperature of about 150° C.

General chloridization reaction is shown below in formula (III). The chloridization reaction may be carried out in an oxidizing environment to prevent formation of ferrous chloride. Higher temperatures favor formation of ferrous chloride. Temperatures above from about 200° C. to about 220° C. favor formation of a coating, non-porous iron oxide layer around particles, reducing chloridization efficiency.

$$MO(s) + 2HCl(g) \rightarrow MCl_2(s) + H_2O(g) \quad (III)$$

Advantageously, the chloridization reaction of formula (III) is more favorable at lower temperatures. More specifically, without wishing to be bound by any particular theory, based on Gibbs free energy calculations using formula (IV) it is believed that the chloridization reaction for base metals reduces the total system entropy, while increasing temperature actually makes the reaction less favorable.

$$dG = dH - TdS \quad (IV)$$

Figure 4:
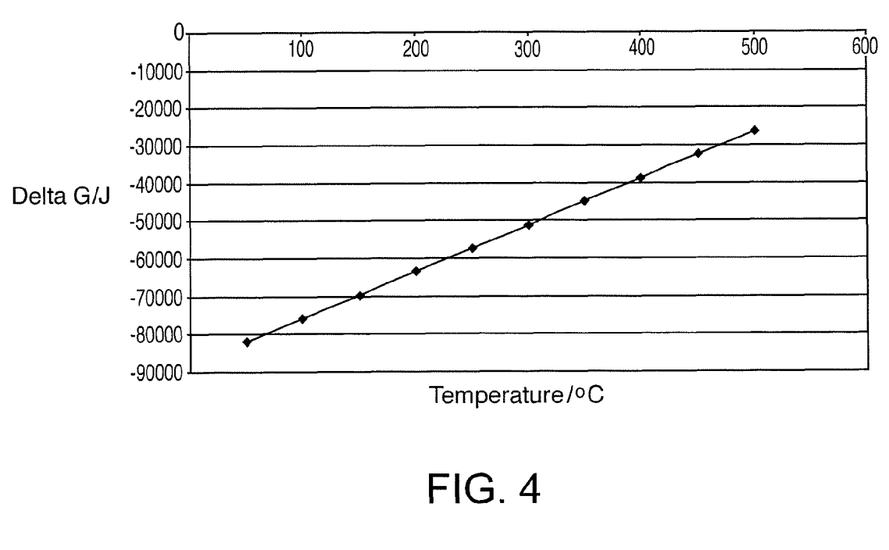
FIG. 4 is a graph illustrating Gibbs free energy for chloridization of nickel oxide.

The table 1, which is listed below and FIG. 4 illustrate the trend of Gibbs free energy for nickel oxide chloridization in relation to temperature.

TABLE 1

| Temperature ° C. | Gibbs Free Energy (ΔG), kJ |
| --- | --- |
| 50 | −82,009 |
| 100 | −75,850 |
| 150 | −69,689 |
| 200 | −63,515 |
| 250 | −57,307 |
| 300 | −51,076 |
| 350 | −44,850 |
| 400 | −38,633 |
| 450 | −32,428 |
| 500 | −26,232 |

The chloridization reaction of formula (III) requires suitable kinetics at these temperatures to ensure suitable HCl utilization. Proper liberation of the metal oxides must be provided in order to make efficient gas-solid contact. Particle coating should also be avoided.

After chloridization in the section 14, the ore moves to the last section of the furnace 10, the pyrohydrolysis section 16. The pyrohydrolysis section 16 provides water steam to the metal chlorides. Temperature of the pyrohydrolysis reaction may range from about 250° C. to about 600° C. In one embodiment, the temperature may be from about 300° C. to about 400° C., e.g., 350° C. At these temperatures, metal chlorides such as nickel, cobalt and copper are not decomposed. Thus, only some of metal chlorides are converted into the corresponding oxides, such as iron and aluminum, while chlorides of other metals, such as nickel, cobalt, copper, magnesium and calcium are not affected. Accordingly, in response to pyrohydrolysis, some of the metal chlorides are decomposed, while other metal chlorides remain intact. This allows for formation of an effluent that is free of iron and aluminum as well as for regeneration of the HCl. The regenerated hydrogen chloride may be returned to the chloridization section 14, allowing the furnace 10 to operate in a so-called "counter-current" manner in which the ore is dried while HCl is recovered from pyrohydrolysis and later regeneration steps. HCl may also be used for in-situ chloridization.

Stabilizing iron and aluminum compounds may be accomplished by the pyrohydrolysis step. The chlorides of iron and aluminum compounds can be thermally decomposed into respective oxides, regenerating hydrogen chloride, thus providing a solution that is free from such contaminants, thereby obviating the need for extra, costly purification operations. The general reaction for the pyrohydrolysis is shown in formula (V), where M signifies a metal. The reaction includes continuous supply of water vapor at elevated temperatures.

Ferric chloride also disperses into the ore, breaking the ore's matrix. When ferric chloride is decomposed, HCl is regenerated and reacts with any unreacted value metals, such as nickel, copper and cobalt. This, in effect, advantageously provides a second chloridization at a higher temperature.

Magnesium may be removed from the ore by providing an environment saturated with water, which, for example, may have a ratio of water to HCl of about 10. In this environment, $MgCl_2$ decomposes into MgO at relatively low temperatures, i.e., from about 300° C. to about 400° C. This allows for removal of Mg from the ore.

After exiting the furnace 10, the ore is deposited in agitated tanks in an aqueous solution. Nickel, cobalt and copper chlorides are extremely soluble in water, whereas iron and aluminum oxides produced by the pyrohydrolysis are insoluble. The pH of the solution is controlled from about 1.0 to about 5.0, such that the solution does not dissolve oxides of iron and aluminum, but allows for complete dissolution of the chlorides. In one embodiment, the pH of the solution may range from about 2.0 and to about 4.0. In another embodiment, the pH may range from about 2.0 and to about 3.0. The residence time may range from about 0.2 hours to about 10 hours, e.g., about 3 hours. The requisite energy for dissolution kinetics comes from the ore heat as the ore leaves the furnace 10. Temperature of the solution may be any suitable temperature, such as from about 15° C. to about 100° C., e.g., about 90° C. Increasing and controlling the temperature may increase the dissolution rate and solubility of the chlorides.

The chlorides are solubilized, leaving the unreacted material and newly formed iron and aluminum oxides as solids. The solution then undergoes solid-liquid separation such that the solution is enriched with metal values that can be refined by any known downstream choices.

The dissolved metal nickel and cobalt ions may be removed from the solution using any known purification method, such as, but not limited to, ion-exchange resins. Any resin circuit suitable for selectively absorbing nickel and cobalt from the solution may be used, such as fixed-bed circuits, or through any continuous, counter-current process, which selectively elutes cobalt and nickel.

Another process for eluting nickel may involve conversion of ionic nickel into a mixed nickel hydroxide product (MHP). This may be accomplished by adding magnesium or calcium oxide to the solution to form a mixed nickel hydroxide product. MHP is obtained by precipitation with magnesium or calcium oxide, while calcium and magnesium chlorides remain in solution. The solution from MHP is then evaporated and the soluble salts, crystallized in their hydrated forms. These crystals are then mixed with sulfuric acid or pyrohydrolyzed, forming HCl gas for subsequent recycling of the HCl in the above-described chloridization reaction.

After the removal of value metals, the remaining chlorides can be decomposed into oxides, regenerating HCl in the process. This regeneration can be accomplished via sulfation or additional pyrohydrolysis. Acid regeneration of the HCl via sulfation of potassium chloride forms HCl gas and $K_2SO_4$, similar to the HCl formation described above.

The present disclosure provides for a number of advantages, such as elimination of costly solid-liquid separation and flow chart simplification as well as HCl regeneration. This allows for processing of ores with high iron and high magnesium, thereby increasing value metals extraction and total revenue.

In particular, the separation of metals occurs without utilizing costly solid-liquid separation. Nickel recovery is also increased, due to reduced or eliminated precipitation of iron and/or aluminum hydroxides that frequently carry nickel. In addition, HCl is regenerated during the pyrohydrolysis step of the chloridization process and the final step, obviating the need for a neutralizing agent. A further advantage of the present disclosure is the ability to provide an iron and aluminum-free effluent. That simplifies the process, removing the need for iron removal stages, reducing the use of neutralizing agents. As a result, the process reduces nickel loss, since there is no complex precipitation of iron and aluminum hydroxides, which can form jarosite or co-precipitates of nickel and cobalt values. Therefore, capital and operational costs are reduced, as simpler and easier to operate unit operations are applied and materials with high iron and high magnesium content can be treated to extract value metals of interest.

The following examples are included for purposes of illustrating certain embodiments and aspects of the present disclosure. As such, the examples are not intended to limit the present disclosure in any matter whatsoever.

EXAMPLE 1

100 g of a limonite-type ore was contacted with hydrochloric acid for 180 minutes and 150° C. The sample contained 1.34% Ni, 0.096% Co, 0.015% Cu, 1.81% Cr, 49.6% Fe, 3.36% Al, 0.66% Mg and 06% SiO2. Extraction results are in the table 2 below.

TABLE 2

Extraction for example 1.
Element Extraction

| Ni | Co | Cu | Cr | Fe | Al |
|----|----|----|----|----|----|
| 96% | 95% | 70% | 16% | 38% | 77% |

EXAMPLE 2

A laterite charge was subjected to a 180-minute chloridization, at 150° C., with air injection. The sample contained 1.39% Ni, 0.070% Co, 0.017% Cu, 1.61% Cr, 45.1% Fe, 3.02% Mg and 10% SiO2. Extraction is summarized in table 3 below.

TABLE 3

Extraction for example 2.
Element Extraction

| Ni | Co | Cu | Cr | Fe | Al |
|----|----|----|----|----|----|
| 95% | 95% | 90% | 46% | 60% | 81% |

EXAMPLE 3

An oxide material was chloridized, at 200° C. for 90 minutes. Chemical analysis showed that it contained 1.39% Ni, 0.089% Co, 0.018% Cu, 1.58% Cr, 46.5% Fe, 2.84% Al, 0.96% Mg and 8% SiO2. Results are shown in table 4 below.

TABLE 4

Extraction for example 3.
Element Extraction

| Ni | Co | Cu | Cr | Fe | Al |
|---|---|---|---|---|---|
| 92% | 88% | 74% | 35% | 36% | 73% |

EXAMPLE 4

A laterite type ore with 1.49% Ni, 0.082 Co, 0.013% Cu, 1.75% Cr, 47.6% Fe, 3.20% Al, 1.51% Mg and 10% SiO2 was contacted with hydrochloric acid for 45 minutes at 250° C. Results are gathered at table 5 below.

TABLE 5

Extraction for example 4.
Element Extraction

| Ni | Co | Cu | Cr | Fe | Al |
|---|---|---|---|---|---|
| 91% | 89% | 84% | 33% | 42% | 73% |

EXAMPLE 5

A laterite charge of 200 g was submitted to chloridization at 150° C. for 60 minutes and later to pyrohydrolysis for another 60 minutes and 350° C. Sample had 0.73% Ni, 0.06% Co, 0.00% Cu, 30% Fe, 1.04% Cr and 11% Al. Resulting material was dissolved, forming a 15% solids pulp, pH was maintained between 1 and 3. Results in table 6 below show metals extraction in leachate.

TABLE 6

Extraction for example 5.
Element Extraction

| Ni | Co | Cu | Cr | Fe | Al |
|---|---|---|---|---|---|
| 92% | 99% | 0% | 0% | 1% | 1% |

EXAMPLE 6

A saprolite sample with 0.81% Ni 0.04% Co, 0.00% Cu, 17% Fe, 0.04% Cr and 4.20% Al was leached with gaseous hydrochloric acid for 50 minutes at 200° C. The same sample was subjected to pyrohydrolysis at 400° C. for 60 minutes. Resulting material was dissolved, forming a 15% solids pulp, pH was maintained between 1 and 3. Results in table 7 below show metals extraction in leachate.

TABLE 7

Extraction for example 6.
Element Extraction

| Ni | Co | Cu | Cr | Fe | Al |
|---|---|---|---|---|---|
| 88% | 100% | 0% | 0% | 0% | 0% |

EXAMPLE 7

With 1.00% Ni, 0.05% Co, 0.00% Cu, 20% Fe, 1.71% Cr and 2.57% Al, an oxide ore was first chloridized at 150° C. and 2 hours, later being pyrohydrolised for one hour and 350° C. Resulting material was dissolved, forming a 15% solids pulp, pH was maintained between 1 and 3. Results in table 8 below show metals extraction in leachate.

TABLE 8

Extraction for example 7.
Element Extraction

| Ni | Co | Cu | Cr | Fe | Al |
|---|---|---|---|---|---|
| 91% | 96% | 0% | 1% | 1% | 2% |

While in accordance with the provisions of the statute, there are illustrated and described herein specific embodiments of the disclosure, those skilled in the art will understand that changes may be made in the form of the disclosure covered by the claims and that certain features of the disclosure may sometimes be used to advantage without a corresponding use of the other features. For example, the concentrations, times, pH, flow, current density, and electrolyte ingredients may be varied by those skilled in the art in accordance with conventional wisdom.

What is claimed is:

1. A method for recovering base metal values from oxide ore including a first metal selected from the group consisting at least one of iron and aluminum and a second metal selected from the group consisting of at least one of nickel, cobalt and copper, the method comprising the steps of:
   contacting the oxide ore with hydrogen chloride to obtain chlorides of the first and second metals;
   subjecting at least the first and second metals to pyrohydrolysis at a predetermined temperature to decompose the chlorides of the first metal into oxides;
   mixing the oxides of the first metal and the chlorides of the second metal in an aqueous solution to dissolve the chlorides of the second metal; and
   recovering the dissolved ions of the second metal from the aqueous solution,
   wherein the steps of contacting the oxide ore with hydrogen chloride, subjecting at least the first and second metals to pyrohydrolysis, mixing the oxides of the first metal and the chlorides of the second metal, and recovering the dissolved ions of the second metal from the aqueous solution are performed in a resin-free environment.

2. The method according to claim 1, wherein the oxide ore is laterite ore.

3. The method according to claim 1, further comprising the step of granulating the oxide ore to at least a first particle size.

4. The method according to claim 3, wherein the first particle size is from about 0.5 mm to about 50 mm.

5. The method according to claim 1, wherein the contacting step further comprises the step of:contacting the oxide ore with gaseous hydrogen chloride flux.

6. The method according to claim 1, further comprising the step of:drying the oxide ore at a temperature from about 60° C. to about 150° C.

7. The method according to claim 1, wherein the predetermined temperature is from about 25° C. to about 600° C.

8. The method according to claim 1, wherein the pH of the aqueous solution is from about 1.0 to about 5.0.

9. The method according to claim 8, wherein the aqueous solution is maintained at a temperature from about 15° C. to about 100° C.

10. The method according to claim 1, wherein the mixing step is performed for a period from about 0.2 hours to about 10 hours.

11. The method according to claim 1, further comprising the step of regenerating hydrochloric acid and reusing the regenerated hydrochloric acid in the contacting the oxide ore step.

12. A method for treating a laterite ore comprising a nickel oxide and at least one base metal oxide, the method comprising the steps of contacting the laterite ore with gaseous hydrogen chloride to obtain a nickel chloride and at least one base metal chloride;

subjecting the nickel chloride and at least one base metal chloride to pyrohydrolysis to decompose the at least one base metal chloride into at least one base metal oxide;

mixing the nickel chloride and the at least one metal oxide in an aqueous solution to dissolve the nickel chloride; and recovering the dissolved ions of the nickel chloride from the aqueous solution, wherein the steps of contacting the oxide ore with hydrogen chloride, subjecting at least the first and second metals to pyrohydrolysis, mixing the oxides of the first metal and the chlorides of the second metal, and recovering the dissolved ions of the second metal from the aqueous solution are performed in a resin-free environment.

13. The method according to claim 12, wherein the pH of the aqueous solution is from about 1.0 to about 5.0.

14. The method according to claim 13, wherein the aqueous solution is maintained at a temperature from about 15° C. to about 100° C.

15. The method according to claim 12, wherein the mixing step is performed for a period from about 0.2 hours to about 10 hours.

16. The method according to claim 12, further comprising the step of regenerating hydrochloric acid and reusing the regenerated hydrochloric acid in the contacting the oxide ore step.

17. The method according to claim 1, wherein subjecting at least the first and second metals to pyrohydrolysis is only performed after contacting the oxide ore with hydrogen chloride.

18. The method according to claim 12, wherein subjecting the nickel chloride and the at least one base metal chloride to pyrohydrolysis is only performed after contacting the oxide ore with hydrogen chloride.

* * * * *